United States Patent
Rath et al.

(10) Patent No.: US 7,956,156 B2
(45) Date of Patent: Jun. 7, 2011

(54) METHOD FOR THE REMOVAL OF ISOBUTENE OLIGOMERS FROM AN ISOBUTENE POLYMER

(75) Inventors: Hans Peter Rath, Gruenstadt (DE); Phillip Hanefeld, Heidelberg (DE); Helmut Mach, Heidelberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 36 days.

(21) Appl. No.: 12/514,899

(22) PCT Filed: Nov. 13, 2007

(86) PCT No.: PCT/EP2007/062286
§ 371 (c)(1),
(2), (4) Date: May 14, 2009

(87) PCT Pub. No.: WO2008/058970
PCT Pub. Date: May 22, 2008

(65) Prior Publication Data
US 2010/0004427 A1    Jan. 7, 2010

(30) Foreign Application Priority Data
Nov. 14, 2006 (EP) .................................... 06124070

(51) Int. Cl.
*C08G 63/02* (2006.01)
*C08G 63/00* (2006.01)

(52) U.S. Cl. ........ 528/499; 523/328; 523/330; 524/458; 524/460; 528/502; 528/503

(58) Field of Classification Search ................ 523/328, 523/330; 524/458, 460; 528/499, 502, 503
See application file for complete search history.

(56) References Cited

U.S. PATENT DOCUMENTS

| 5,408,018 A | 4/1995 | Rath |
| 5,448,001 A | 9/1995 | Baird |
| 5,516,818 A * | 5/1996 | Chen et al. ............... 523/332 |
| 6,348,636 B1 * | 2/2002 | Racz ........................ 585/820 |
| 2003/0191257 A1 | 10/2003 | Wettling et al. |

FOREIGN PATENT DOCUMENTS

WO    02 06359    1/2002

OTHER PUBLICATIONS

U.S. Appl. No. 12/597,009, filed Oct. 22, 2009, Hanefeld, et al.
U.S. Appl. No. 12/935,443, filed Sep. 29, 2010, Mattmann, et al.

* cited by examiner

*Primary Examiner* — Terressa M Boykin
(74) *Attorney, Agent, or Firm* — Oblon, Spivak, McClelland, Maier & Neustadt, L.L.P.

(57) ABSTRACT

A process is described for removing isobutene oligomers from an isobutene polymer by stripping the isobutene polymer with vapors of a saturated hydrocarbon having at least 8 carbon atoms and at least partly driving out the isobutene oligomers. Troublesome isobutene oligomers are substantially removed without impairing the reactivity of the isobutene polymer (expressed as the content of the methylidene double bonds).

19 Claims, No Drawings

METHOD FOR THE REMOVAL OF ISOBUTENE OLIGOMERS FROM AN ISOBUTENE POLYMER

This application is a 371 of PCT/EP07/62286, filed Nov. 13, 2007.

The present invention relates to a process for removing isobutene oligomers from an isobutene polymer.

Highly reactive polyisobutenes having a number-average molecular weight of from 500 to 5000 are sought after as intermediates for preparing additives for lubricants and fuels. A majority is sent to further reactions, such as maleation, imidation, hydroformylation or reductive amination. These reactions introduce polar groups into the molecule to form amphiphilic molecules whose properties are determined by the coexistence of the nonpolar polyisobutenyl radical and the polar group.

Highly reactive polyisobutenes refer to those which have a high content of terminal methylidene groups. In the context of the present application, methylidene groups are understood to mean those double bonds whose position in the polyisobutene macromolecule is described by the general formula

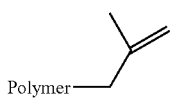

in which "polymer" represents the polyisobutene radical shortened by one isobutene unit. The methylidene groups exhibit the highest reactivity, whereas the double bonds further toward the interior of the macromolecules exhibit only a lower reactivity, if any, in functionalization reactions.

The preparation of polyisobutenes succeeds through Lewis acid-catalyzed polymerization of isobutene. The Lewis acid catalyst used is frequently boron trifluoride, usually in combination with a compound capable of complex formation with boron trifluoride. The polymerization is effected generally in the presence of an inert diluent such as n-hexane. As soon as the desired degree of polymerization has been attained, the catalyst is removed and/or inactivated, and unconverted isobutene and the inert diluent are removed by distillation. Such a process is disclosed, for example, in U.S. Pat. No. 5,408,018.

The polymerization of isobutene does not afford molecules of a uniform molecular weight. Instead, a molecular weight distribution is obtained, which, in the logarithmic plot, has a visible maximum $M_{max}$ and declines both toward higher and lower molecular weights. The presence of oligomers and low molecular weight polymers is disadvantageous for various reasons in some applications. They lead, inter alia, to an undesired broadening of the molecular weight distribution. The isobutene oligomers are particularly troublesome when the polymer is to be functionalized with polar groups. Since the nonpolar radical in the reaction products of the isobutene oligomers comprises only few isobutene units, their properties differ from those of the larger molecules, i.e. they have the desired properties only to a restricted degree, or they even have actually disadvantageous properties for later use. For instance, the functionalization products of the isobutene oligomers may have unacceptable aging and swelling behavior. Various scavenging reactions and aftertreatments have been proposed in order to reduce the harmful effects of small polar-functionalized molecules.

Some of the isobutene oligomers are removed in the workup of the isobutene polymer. The workup typically comprises the distilling-off of the unconverted isobutene and/or of the inert diluent in one or more distillation steps. The last step is usually a vacuum distillation at typically from 200 to 220° C. and a pressure of from 3 to 30 mbar (absolute), which distills off isobutene oligomers to a certain degree while the polyisobutene remains as a residue. The last residues of the isobutene oligomers are retained persistently in the polyisobutene; their vapor pressure is reduced by more than one factor of ten. The temperature and/or residence time in the vacuum distillation cannot, though, be increased as desired, since the polyisobutene depolymerizes at excessively high temperature and/or excessively long residence time and its reactivity suffers.

It is an object of the present invention to free isobutene polymers from isobutene oligomers to a greater degree than is possible by mere use of temperature and/or reduced pressure.

The object is achieved by a process for removing isobutene oligomers from an isobutene polymer by stripping the isobutene polymer with vapors of a saturated hydrocarbon having at least 8 carbon atoms and at least partly driving out the isobutene oligomers.

"Isobutene polymers" are monoethylenically unsaturated molecules which are formed predominantly (preferably to an extent of at least 95% by weight) from repeat isobutene units. The process according to the invention can be applied particularly to isobutene polymers having a number-average molecular weight (before the inventive treatment) of from 500 to 5000, preferably from 900 to 2500.

The isobutene polymer treated generally has a content of molecules with terminal methylidene groups (terminal groups of the formula —[—C(CH$_3$)=CH$_2$]) of more than 60 mol %, especially more than 80 mol %. The polydispersity Mw/Mn is preferably not more than 2.0, especially not more than 1.9.

"Isobutene oligomers" shall be understood to mean monoethylenically unsaturated molecules which are formed from repeat isobutene units and generally have a molecular weight of less than 500. Usually, the isobutene oligomers comprise from 2 to 6 isobutene units. The process according to the invention can achieve especially a substantial removal of the isobutene dimers (isooctenes), isobutene trimers, isobutene tetramers, isobutene pentamers and isobutene hexamers.

The stripping of the isobutene polymer can be achieved in various ways familiar to those skilled in the art. For instance, a gaseous stream of the saturated hydrocarbon can be passed through a liquid phase of the isobutene polymer or a solution thereof. Alternatively, a gaseous stream of the saturated hydrocarbon, for example in a column or a bubble column, can be conducted counter to a liquid phase of the isobutene polymer or a solution thereof. The column or bubble column may comprise internals which provide a large interface between gas and liquid phase and facilitate mass transfer. Suitable internals are, for example, random or structured packings or trays.

In a particularly appropriate embodiment, the isobutene polymer (as such or in the form of a solution) is admixed with the saturated hydrocarbon and the saturated hydrocarbon is evaporated off at least partly. The evaporation is effected at elevated temperature and/or reduced pressure, for example at from 100 to 300° C., preferably from 150 to 250° C., and less than 1 bar, preferably less than 150 mbar, for example from 1 to 30 mbar (absolute), most preferably at temperatures of from 150 to 250° C. under a pressure of from 2 to 20 mbar (absolute). The evaporation can also be performed by decompressing (flashing) a liquid mixture of the saturated hydrocarbon and of the isobutene polymer from a high pressure to a low pressure, which, owing to the decompression, forms a gas phase which comprises the majority of the saturated hydrocarbon and of the isobutene oligomers. Before the decompression, the mixture is preferably heated, for example to from 100 to 300° C., preferably from 150 to 250° C. The pressure difference is, for example, from 2 to 20 bar and the end pressure is from 1 to 50 mbar, preferably from 2 to 30 mbar (absolute).

The industrial preparation of isobutene polymers generally comprises final distillation and/or decompression steps for removing the unconverted isobutene and/or volatile diluents. The process according to the invention can in practice therefore be performed easily by admixing the isobutene polymer, at least before the last distillation and/or decompression step, with a saturated hydrocarbon used in accordance with the invention.

A more substantial removal of the isobutene oligomers can be achieved when the steps of hydrocarbon addition and evaporation are repeated at least once, for example once, twice or three times.

The amount of the saturated hydrocarbon employed is (per cycle of hydrocarbon addition and evaporation) generally from 1 to 15% by weight, usually from 5 to 10% by weight, based on the weight of the isobutene polymer.

It is possible if desired to condense the saturated hydrocarbon which has evaporated off, to remove entrained isobutene oligomers and to reuse the saturated hydrocarbon.

The saturated hydrocarbon used in accordance with the invention has at least 8 carbon atoms, preferably from 8 to 20 carbon atoms, especially from 10 to 16 carbon atoms. The hydrocarbons are linear, branched or cyclic saturated hydrocarbons and especially technical mixtures of such hydrocarbons. Suitable technical hydrocarbon mixtures are, for example, isoparaffins, as obtained in refineries in the deparaffinization of mineral oils. The preferred boiling range at standard pressure (1013 mbar) is from 100 to 350° C., especially from 100 to 250° C.

In many cases, the use of narrow-boiling saturated hydrocarbon fractions is preferred. Preferably at least 90% by weight of the saturated hydrocarbon therefore has a boiling point at standard pressure within a temperature region of 15° C.

In particular embodiments, it is preferred that the saturated hydrocarbon comprises fractions whose boiling point is between the boiling points of isobutene dimer and isobutene trimer. For example, at least 40% by weight, preferably at least 50% by weight, in particular at least 90% by weight of the saturated hydrocarbon has a boiling point which is between the boiling points of isobutene dimer and isobutene trimer.

In other embodiments, it is preferred that the saturated hydrocarbon comprises fractions whose boiling point is between the boiling points of isobutene trimer and isobutene tetramer. For example, at least 40% by weight, preferably at least 50% by weight, in particular at least 90% by weight of the saturated hydrocarbon has a boiling point which is between the boiling points of isobutene trimer and isobutene tetramer.

Isobutene polymers are sometimes highly viscous and form viscous interface layers which hinder heat and mass transfer on relatively cold vessel walls, heat exchange surfaces or interfaces. It may therefore be appropriate to admix the isobutene polymer with a nonvolatile diluent before the stripping. The nonvolatile diluents act as flow assistants and boiling assistants. They lead firstly to a drastic reduction in the viscosity of the isobutene polymer. The nonvolatile diluents lead to enhanced Brownian molecular motion and thus break the viscous interface layers of the high molecular weight polyisobutene which act as thermal insulators and improve the devolatilization. The nonvolatile diluents remain substantially in the isobutene polymer; they therefore have to be selected such that their presence does not impair the later use of the isobutene polymer. The preferred boiling range of the nonvolatile diluents at standard pressure (1013 mbar) is from 300 to 450° C. Suitable nonvolatile diluents are, for example, mineral oils such as standardizing oils, or poly-alpha-olefins such as hydrogenated decene trimers. Nonvolatile diluents may be used, for example, in an amount of from 1 to 15% by weight, usually from 5 to 10% by weight, based on the weight of the isobutene polymer. The presence of a diluent also eases, for example, the filtration of the reaction mixture after a chemical derivatization of the polyisobutene.

Isobutene can be polymerized continuously or batchwise, but preferably continuously. Processes for continuously polymerizing isobutene in the presence of Lewis acid catalysts in inert diluents are known per se. In a continuous process, a portion of the reaction mixture formed in the polymerization reactor is discharged continuously. An amount of starting materials, isobutene or isobutenic hydrocarbon here, corresponding to the discharge is supplied continuously to the polymerization reactor. The ratio of amount present in the polymerization reactor to the amount which is discharged determines the residence time. The circulation/feed ratio which, in the continuous polymerization of isobutene to polyisobutene, is generally in the range from 1000:1 to 1:1, preferably in the range from 500:1 to 5:1 and especially in the range from 200:1 to 50:1 vol./vol., determines the concentration jump of the isobutene in the reactor. The mean residence time of the isobutene to be polymerized in the polymerization reactor may be from five seconds to several hours. Residence times of from 1 to 30 minutes, especially from 2 to 20 minutes, are particularly preferred.

Isobutene is polymerized in the customary reactors, such as stirred tanks, tubular reactors, tube bundle reactors and loop reactors, preference being given to loop reactors, i.e. tube (bundle) reactors with stirred tank characteristics. Particularly favorable tubular reactors are those with tube cross sections which lead to turbulence in some regions.

The polymerization is performed generally at a polymerization temperature in the range from −60° C. to +40° C., preferably below 0° C., more preferably in the range from −30° C. to 0° C. and especially in the range from −25° C. to −5° C. The heat of polymerization is removed appropriately with the aid of a cooling apparatus. This may, for example, be operated with liquid ammonia as the coolant. Another means of removing the heat of polymerization is evaporative cooling. In this case, the heat released is removed by partially evaporating the reaction mixture, for example the isobutene and/or other volatile constituents of the isobutene feed, or a volatile diluent, for example isobutane or propane. Preference is given to working under isothermal conditions, i.e. the temperature of the liquid reaction phase in the polymerization reactor has a steady-state value and changes only to a slight degree, if at all, during the operation of the reactor.

The concentration of the isobutene in the liquid reaction phase is generally in the range from 0.2 to 50% by weight, preferably in the range from 0.5 to 20% by weight, based on the liquid reaction phase.

Suitable feedstocks are both isobutene itself and isobutenic $C_4$ hydrocarbon streams, for example $C_4$ raffinates, $C_4$ cuts from isobutane dehydrogenation, $C_4$ cuts from steam crackers, FCC crackers (fluid catalyzed cracking), provided that they have been substantially freed of 1,3-butadiene present therein. Suitable $C_4$ hydrocarbon streams comprise generally less than 1000 ppm, preferably less than 200 ppm, of butadiene. The presence of 1-butene, cis- and trans-2-butene is substantially uncritical, although they are incorporated into the growing polymer chain to a slight degree in the case of low isobutene concentrations. Typically, the isobutene concentration in the $C_4$ hydrocarbon streams is in the range from 20 to 70% by weight. In the case of use of $C_4$ cuts as a starting material, the hydrocarbons other than isobutene assume the role of a substantially inert diluent. The isobutenic feed may comprise small amounts of contaminants such as water, carboxylic acids or mineral acids without there being critical yield or selectivity losses in the polymerization. It is appropriate to avoid enrichment of these impurities by removing such harmful substances from the isobutenic feed, for example, by adsorption and solid adsorbents such as activated carbon, molecular sieves, aluminum oxide, silica gel or ion exchangers, preferably at from −10 to 30° C.

Suitable inert diluents are those solvents or solvent mixtures which are inert toward the reagents used. Suitable diluents are, for example, saturated hydrocarbons such as butane, pentane, hexane, heptane, for example n-hexane, i-octane, cyclopentane, halogenated hydrocarbons such as methylene chloride, dichloromethane or trichloromethane, and mixtures of the aforementioned diluents, among which technical pentane or hexane with a proportion of the n-alkane of from 40 to 70% by weight are particularly preferred. The diluents are preferably freed before use from impurities such as water, carboxylic acids or mineral acids, for example by adsorption on solid adsorbents such as activated carbon, molecular sieves, aluminum oxide, silica gel or ion exchangers.

A particularly preferred Lewis acid catalyst is boron trifluoride, preferably in combination with a cocatalyst. Appropriately, gaseous boron trifluoride is utilized, it being possible to use technical boron trifluoride still comprising small amounts of sulfur dioxide and $SiF_4$, but preferably high-purity boron trifluoride having a purity of about 99.5% by weight.

Suitable cocatalysts are generally oxygen compounds which preferably have at least one divalent oxygen atom. Suitable oxygen compounds are, as well as water, organic compounds having up to 30 carbon atoms. Examples thereof are $C_1$-$C_{30}$-alkanol and -cycloalkanols, $C_2$-$C_{10}$-diols, $C_1$-$C_{20}$-carboxylic acids, $C_4$-$C_{12}$-carboxylic anhydrides and $C_2$-$C_{20}$-dialkyl ethers. Among these, $C_1$-$C_{20}$-alkanols, especially $C_1$-$C_4$-alkanols, are preferred, which may, if appropriate, be used together with $C_2$-$C_{20}$-dialkyl ethers.

Particularly preferred cocatalysts are monohydric secondary $C_3$-$C_{20}$-alkanols, especially in combination with tert-butyl ethers. Examples include isopropanol, 2-butanol, sec-pentanol, sec-hexanol, sec-heptanol, sec-octanol and the like. Particular preference is given to using 2-butanol and especially isopropanol. tert-Butyl ethers include methyl tert-butyl ether (MTBE), ethyl tert-butyl ether (ETBE) and isopropyl tert-butyl ether, of which MTBE is preferred owing to its ready availability.

The molar ratio of boron trifluoride to cocatalyst is preferably from 1:1 to 1:10, especially from 1:1.1 to 1:5 and more preferably from 1:1.2 to 1:2.5.

The concentration of the Lewis acid catalyst in the reactor is generally in the range from 0.01 to 1% by weight, based on the liquid reaction phase, especially in the range from 0.02 to 0.7% by weight and more preferably in the range from 0.03 to 0.5% by weight.

After the desired degree of polymerization has been attained, the catalyst is removed and/or deactivated and the polymerization is terminated in this way. For the catalyst deactivation, it is possible to use deactivators, for example water, alcohols, acetonitrile, ammonia or aqueous solutions of mineral bases or carbonates, which are added to the reaction mixture. For this purpose, it is also possible to use acidified aqueous solutions. Instead of quantitatively deactivating the catalyst in the reaction mixture, it can either be removed quantitatively from the reaction mixture or be removed partly from the reaction mixture, and the residual catalyst in the reaction mixture can be deactivated. Advantageously, the catalyst is removed according to the description of WO 99/31151.

To remove the catalyst from the reaction mixture, it is advisable first to reduce the isobutene concentration to less than 2% by weight, preferably less than 1% by weight and especially less than 0.5% by weight, based on the reaction mixture. To remove the catalyst, preference is given to using soluble boron trifluoride complex catalysts with limited solubility in the reaction mixture and/or to cooling the reaction mixture to temperatures of, for example, from 5 to 30 Kelvin below the reaction temperature, preferably from 10 to 20 Kelvin below the reaction temperature; residence times of from 10 to 60 minutes are advantageous.

The reduction of the isobutene concentration and/or the cooling lowers the solubility of the catalyst in the reaction mixture. The catalyst is obtained in the form of finely distributed droplets which are generally converted rapidly to a coherent phase. The catalyst phase has a higher density than the polymer solution and can be removed from the product phase with the aid of separators or other apparatus. If the catalyst is obtained only in the form of ultrafinely distributed droplets, it is possible to make use of customary measures for droplet enlargement, for example coalescence filters.

In the further course of the workup, the reaction mixture is appropriately subjected to one or more extractions—typically with water—to remove residual amounts of catalyst.

The reaction mixture is then freed by distillation from unconverted isobutene and/or inert diluent. The term "distillation" should be understood at its greatest extent and shall comprise all procedures in which the unconverted isobutene and/or the diluent are removed as a gas or vapor from the polyisobutene obtained as a residue. The gaseous isobutene and diluent are generally condensed and recycled into the polymerization apparatus. Distillation shall be understood to mean especially isobaric heating with evaporation of isobutene and/or diluent or adiabatic decompression of the appropriately preheated reaction mixture to form a gas and a liquid phase, and also combinations of adiabatic decompression and isobaric heating. The distillation is effected preferably using columns with separating internals, such as bubble-cap trays or random packings.

The distillation can be performed in one or more stages, for example two stages. In the case of multistage performance, the majority of the unconverted isobutene and/or of the diluent is removed in the first and any further steps, while the remaining residues of the isobutene and diluent are distilled off in the last step.

The invention is illustrated in detail by the examples which follow.

EXAMPLES

A feed of the following composition was used to prepare polyisobutene in a continuous polymerization process:

| | |
|---|---|
| Isobutane | <1% by weight |
| n-Butane | <1% by weight |

-continued

| | |
|---|---|
| 1-Butene | <1% by weight |
| trans-2-Butene | <1% by weight |
| cis-2-Butene | <1% by weight |
| Isobutene | 45% by weight |
| Hexane | 54% by weight |
| Butadiene | <50 ppm |
| Water | about 2 ppm |

Boron trifluoride in an amount of 25 mmol/l of feed and isopropanol in 1.6 times the molar amount based on boron trifluoride were added. The circulation reactor was cooled such that the temperature in the reaction medium was −13° C. The residence time was 8.4 minutes, the circulation/feed ratio was 50 and the isobutene concentration was 5% by weight. The reaction effluent was mixed intensively with water. Subsequently, the two phases formed were separated. The upper phase (referred to hereinafter as "crude product") consisted of polyisobutene, unconverted isobutene and hexane.

The crude product was passed through a heat exchanger, and the heated crude product was then decompressed in a flash vessel. This evaporated the majority of the unconverted isobutene and hexane, which was drawn off as a gas phase at the top of the flash vessel.

The liquid phase was heated with the aid of a heat exchanger. The heated liquid phase was introduced into a distillation column with decompression to 1 bar. A distillate which consisted essentially of isobutene and hexane was distilled over. For the tests which follow, aliquots of the distillation bottoms were used.

The aliquots were admixed with the amount of hydrocarbon specified in the table and treated on a rotary evaporator at 220° C. and 3 mbar for 30 minutes in each case. The residue was weighed and the value found was subtracted from the polyisobutene weight. The "loss" is the difference between the normal devolatilization loss (i.e. without added hydrocarbon) and the actual devolatilization loss. The normal devolatilization loss is 1.9% by weight. The Mw/Mn quotient is a measure of the molecular weight distribution (weight-average molecular weight/number-average molecular weight).

| Example | Paraffin | Paraffin [% by wt.] | Loss [% by wt.] | Mn | Mw/Mn |
|---|---|---|---|---|---|
| 1 | — | — | 0 | 2300 | 1.90 |
| 2 | $C_{10}H_{22}$ | 10 | 2.2 | 2400 | 1.79 |
| 3 | $C_{10}H_{22}$ | 2 × 10 | 3.3 | 2500 | 1.73 |
| 4 | $C_{10}H_{22}$ | 3 × 10 | 3.9 | 2500 | 1.71 |
| 5 | $C_{10}H_{22}$ | 4 × 10 | 4.2 | 2500 | 1.70 |
| 6 | $C_{14}H_{30}$ | 10 | 3.6 | 2500 | 1.72 |
| 7 | $C_{14}H_{30}/C_{20}H_{42}$ | 10/3 | 4.2 | 2550 | 1.70 |
| 8 | — | — | 0 | 1030 | 1.65 |
| 9 | $C_{14}H_{30}$ | 10 | 3.1 | 1110 | 1.54 |

It is seen that the inventive stripping treatment leads to polymers with more homogeneous molecular weight distribution. Owing to the removal of low molecular weight fractions, the number-average molecular weight Mn rises.

The invention claimed is:

1. A process for removing an isobutene oligomer from an isobutene polymer, comprising stripping the isobutene oligomer from the isobutene polymer with vapors of a saturated hydrocarbon having 10-20 carbon atoms to at least partly drive out the isobutene oligomer from the isobutene polymer, wherein
   the isobutene polymer is in neat form or in solution form and has a number-average molecular weight of from 500 to 5000;
   the isobutene polymer has been obtained through Lewis acid-catalyzed polymerization of isobutene; and
   the isobutene oligomer comprises at least one ethylenically unsaturated molecule formed from repeat isobutene units and has a molecular weight of less than 500.

2. The process according to claim 1, comprising mixing the isobutene polymer with the saturated hydrocarbon and evaporating the saturated hydrocarbon at least partly.

3. The process according to claim 2, comprising preheating and decompressing a mixture of the isobutene polymer and the saturated hydrocarbon, and evaporating the saturated hydrocarbon at least partly by the decompression.

4. The process according to claim 2, comprising repeating adding and evaporating hydrocarbon at least once.

5. The process according to claim 1, wherein at least 90% by weight of the saturated hydrocarbon has a boiling point at standard pressure within a temperature range of 15° C.

6. The process according to claim 1, wherein at least 40% by weight of the saturated hydrocarbon has a boiling point between the boiling points of isobutene dimer and isobutene trimer.

7. The process according to claim 1, wherein at least 40% by weight of the saturated hydrocarbon has a boiling point between the boiling points of isobutene trimer and isobutene tetramer.

8. The process according to claim 1, wherein the saturated hydrocarbon has from 16 to 20 carbon atoms.

9. The process according to claim 1, wherein the saturated hydrocarbon has from 10 to 16 carbon atoms.

10. The process according to claim 1, comprising mixing the isobutene polymer with a nonvolatile diluent before the stripping.

11. The process according to claim 1, wherein the isobutene polymer has a number-average molecular weight of from 590 to 2500.

12. The process according to claim 1, wherein the isobutene oligomer comprises from 2 to 6 isobutene units.

13. The process according to claim 1, wherein the isobutene polymer has a number-average molecular weight of from 900 to 2500.

14. The process according to claim 1, wherein the isobutene polymer is in neat form.

15. The process according to claim 1, wherein the isobutene polymer is in solution form.

16. The process according to claim 1, wherein a gaseous stream of the saturated hydrocarbon is passed through a neat liquid phase of the isobutene polymer.

17. The process according to claim 1, wherein a gaseous stream of the saturated hydrocarbon is passed through a solution of the isobutene polymer.

18. The process according to claim 1, wherein a gaseous stream of the saturated hydrocarbon is conducted counter to a neat liquid phase of the isobutene polymer.

19. The process according to claim 1, wherein a gaseous stream of the saturated hydrocarbon is conducted counter to a solution of the isobutene polymer.

* * * * *